United States Patent
Yu

(10) Patent No.: US 10,462,548 B2
(45) Date of Patent: Oct. 29, 2019

(54) EARPLUG STRUCTURE AND EARPHONE DEVICE

(71) Applicant: ACOUS DESIGN CO., LTD., New Taipei (TW)

(72) Inventor: Shih Chang Yu, Taoyuan (TW)

(73) Assignee: ACOUS DESIGN CO., LTD., New Taipei (TW)

( * ) Notice: Subject to any disclaimer, the term of this patent is extended or adjusted under 35 U.S.C. 154(b) by 0 days.

(21) Appl. No.: 15/675,822

(22) Filed: Aug. 14, 2017

(65) Prior Publication Data

US 2018/0338194 A1   Nov. 22, 2018

(30) Foreign Application Priority Data

May 17, 2017 (TW) .............................. 106207146 U

(51) Int. Cl.
  *H04R 1/10* (2006.01)
  *H04M 1/60* (2006.01)
  *H04R 1/34* (2006.01)

(52) U.S. Cl.
  CPC .......... *H04R 1/1016* (2013.01); *H04R 1/105* (2013.01); *H04R 1/1083* (2013.01); *H04M 1/6058* (2013.01); *H04R 1/34* (2013.01)

(58) Field of Classification Search
  CPC .... H04R 1/105; H04R 1/1016; H04R 1/1058; H04R 1/1066; H04R 1/1083
  See application file for complete search history.

(56) References Cited

U.S. PATENT DOCUMENTS

| 4,443,668 | A  | * | 4/1984 | Warren | A61F 11/08 181/135 |
| 6,688,421 | B2 | * | 2/2004 | Dyer | A61F 11/08 181/130 |
| 8,638,970 | B2 | * | 1/2014 | Burton | H04R 1/1016 181/135 |
| 8,693,721 | B2 | * | 4/2014 | Chen | H04R 1/1083 381/370 |
| 9,369,791 | B2 | * | 6/2016 | Tanaka | H04R 1/1016 |
| 9,628,889 | B2 | * | 4/2017 | Kirkpatrick | H04R 1/1058 |
| 2006/0120546 | A1 | * | 6/2006 | Tanaka | H04M 1/05 381/315 |
| 2008/0013772 | A1 | * | 1/2008 | Yang | H04R 1/1016 381/379 |
| 2008/0152163 | A1 | * | 6/2008 | Mulvey | H04R 1/1016 381/74 |

(Continued)

*Primary Examiner* — Fan S Tsang
*Assistant Examiner* — Angelica M McKinney
(74) *Attorney, Agent, or Firm* — WPAT, PC

(57) ABSTRACT

An earplug structure includes a sound guide part, a body part, a sound guide component, and a gap. The sound guide part is configured to be inserted into an ear canal of an ear. The sound guide part includes a sound guide chamber and a sound output opening. The sound guide chamber is disposed inside the sound guide part, and the sound output opening is disposed on the sound guide part for outputting sound to the ear canal. The body part is extending outwardly from the sound guide part and configured to face an auricle region of the ear. The body part includes a receiving space and an opening. The sound guide component is positioned inside the sound guide chamber and is made of hard material. The gap is formed by the sound guide part and sound guide component.

19 Claims, 5 Drawing Sheets

(56) References Cited

U.S. PATENT DOCUMENTS

| | | | |
|---|---|---|---|
| 2011/0176700 A1* | 7/2011 | Hashimoto | H04R 1/1016 381/380 |
| 2012/0039501 A1* | 2/2012 | Silvestri | H04R 1/105 381/380 |
| 2012/0243726 A1* | 9/2012 | Hosoo | H04R 1/1016 381/380 |
| 2014/0286515 A1* | 9/2014 | Bone | H04R 1/1016 381/328 |
| 2015/0110320 A1* | 4/2015 | Liu | H04R 1/1016 381/322 |
| 2017/0353780 A1* | 12/2017 | Huang | H04R 1/10 |
| 2019/0020946 A1* | 1/2019 | Tu | H04R 1/2857 |

* cited by examiner

EARPLUG STRUCTURE AND EARPHONE DEVICE

FIELD OF THE INVENTION

The present disclosure relates to a sound guide structure and a sound guide device, and more particularly to an earplug structure and an earphone device.

BACKGROUND OF THE INVENTION

In-ear (flat head) headphones have continued to be popular due to their lightweight structure. Conventional in-ear (flat head) headphones are, for example, headphone models AirPods and EarPods made by Apple Computer Inc. The in-ear headphones are placed in externally in the ears of a wearer and do not easily transmit sound directly into an ear canal, and therefore sound performance is limited. In addition, conventional technologies do not provide an earplug structure with good sound performance for in-ear (flat head) headphones such as headphone models AirPods and EarPods made by Apple Computer Inc.

Therefore, it is necessary to provide an earplug structure and an earphone device to solve the problems existing in the conventional technologies.

SUMMARY OF THE INVENTION

An object of the present disclosure is to provide an earplug structure with good sound transmission.

Another object of the present disclosure is to provide an earphone device with good sound transmission.

To achieve the above object, the present disclosure provides an earplug structure, including:
 a sound guide part configured to be inserted into an ear canal of an ear, the sound guide part comprising a sound guide chamber and a sound output opening, wherein the sound guide chamber is disposed inside the sound guide part, and the sound output opening is disposed on the sound guide part for outputting sound to the ear canal;
 a body part extending outwardly from the sound guide part and configured to face an auricle region of the ear, the body part comprising a receiving space and an opening, wherein the receiving space is disposed inside the body part and in communication with the sound guide chamber, and the opening is disposed on the body part and in communication with the receiving space;
 a sound guide component positioned inside the sound guide chamber and being made of hard material; and
 a gap formed by the sound guide part and sound guide component.

In embodiments of the present disclosure, the sound guide component is a curved tubular structure.

In embodiments of the present disclosure, the sound guide component comprises a front opening and a sound guide channel, the front opening faces the body part, and the sound guide channel is disposed inside the sound guide component and in communication with the front opening.

In embodiments of the present disclosure, the sound output opening comprises a first sound output opening and a second sound output opening separated from the first sound output opening.

In embodiments of the present disclosure, the sound guide channel comprises a first sound guide channel and a second sound guide channel separated from the first sound guide channel, the first sound output opening is corresponding to and in communication with the first sound guide channel, and the second sound output opening is corresponding to and in communication with the second sound guide channel.

In embodiments of the present disclosure, the earplug structure further includes a plurality of support bars disposed on an inner surface of the sound guide part.

In embodiments of the present disclosure, the support bars are a plurality of soft support bars to form the gap.

In embodiments of the present disclosure, the earplug structure further includes a blocking plate disposed on an inner surface of the body part.

In embodiments of the present disclosure, the blocking plate surrounds the inner surface of the body part and forms a hole.

In embodiments of the present disclosure, the blocking plate is near the sound guide part.

In embodiments of the present disclosure, the sound guide part is a curved tubular structure.

In embodiments of the present disclosure, a facing direction of the opening of the body part is different from a facing direction of the sound output opening.

In embodiments of the present disclosure, a width of the sound guide part is less than a width of the body part.

In embodiments of the present disclosure, the body part is placed in an external portion of the ear when the sound guide part is inserted into the ear canal.

An embodiment of the present disclosure further provides another earphone device, including:
 an earphone, comprising a body; and
 an earplug structure, comprising:
  a sound guide part configured to be inserted into an ear canal of an ear, the sound guide part comprising a sound guide chamber and a sound output opening, wherein the sound guide chamber is disposed inside the sound guide part, and the sound output opening is disposed on the sound guide part for outputting sound to the ear canal;
  a body part extending outwardly from the sound guide part and configured to face an auricle region of the ear, the body part comprising a receiving space and an opening, wherein the receiving space is disposed inside the body part and in communication with the sound guide chamber, the opening is disposed on the body part and in communication with the receiving space, and the body of the earphone is disposed in the receiving space by the opening; and
  a sound guide component positioned inside the sound guide chamber and being made of hard material; and
  a gap formed by the sound guide part and sound guide component.

In embodiments of the present disclosure, the body of the earphone is configured to cause the blocking plate to form a recess to secure the sound guide component.

In embodiments of the present disclosure, the sound guide component is a curved tubular structure.

In embodiments of the present disclosure, the sound guide component comprises a front opening and a sound guide channel, the front opening faces the body part, and the sound guide channel is disposed inside the sound guide component and in communication with the front opening.

In embodiments of the present disclosure, the earphone device further includes a plurality of support bars disposed on an inner surface of the sound guide part.

In embodiments of the present disclosure, the support bars are a plurality of soft support bars to form the gap.

In the embodiment of the present disclosure, the sound guide part is configured to be inserted into an ear canal of an ear of a wearer, and the sound guide part forms a seal with the ear canal of the wearer. The sound guide component is positioned in the sound guide chamber, so that sound is directly transmitted to the ear canal without being easily lost. Therefore, the earplug structure of the embodiment has good sound transmission.

For more clearly and easily understanding above content of the present disclosure, the following text will take one or more embodiments of the present disclosure with reference to the accompanying drawings for detailed description as follows.

DESCRIPTION OF THE DRAWINGS

The technical solution, as well as beneficial advantages, of the present disclosure will be apparent from the following detailed description of one or more embodiments of the present disclosure, with reference to the attached drawings. In the drawings.

DETAILED DESCRIPTION OF THE PREFERRED EMBODIMENTS

Figure 1:
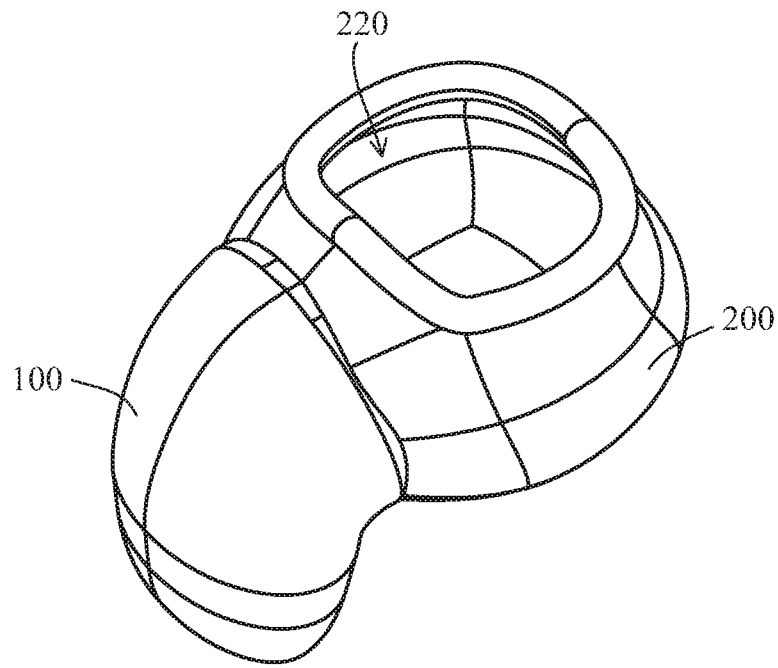
FIG. 1 illustrates an assembled schematic perspective view of an earplug structure according to an embodiment of the present disclosure.
Figure 2:
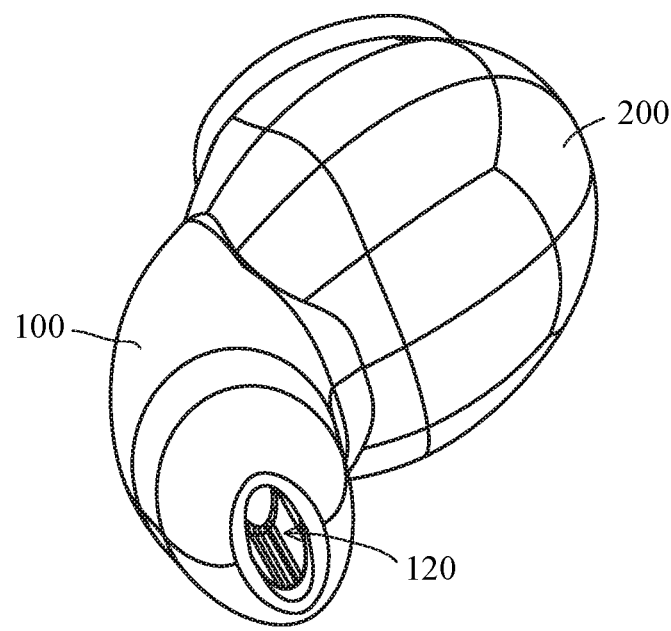
FIG. 2 illustrates another schematic perspective view of the earplug structure according to an embodiment of the present disclosure.
Figure 3:
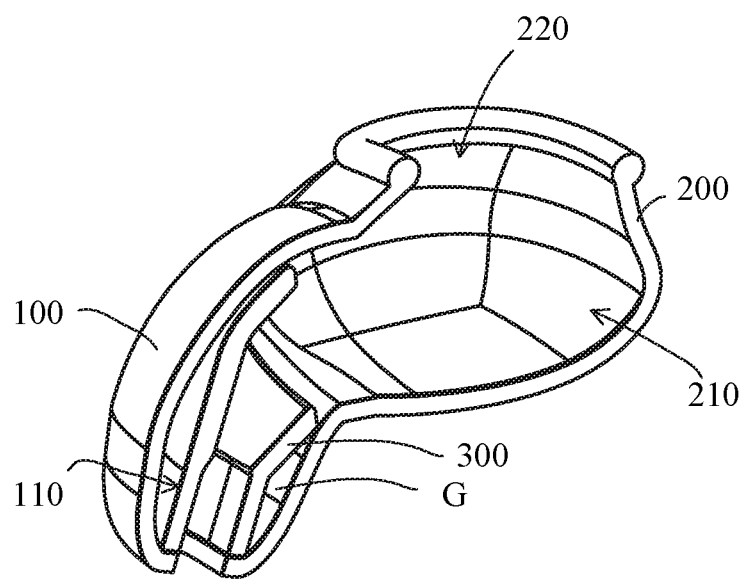
FIG. 3 illustrates a cross-sectional view of the earplug structure according to an embodiment of the present disclosure.
Figure 4:
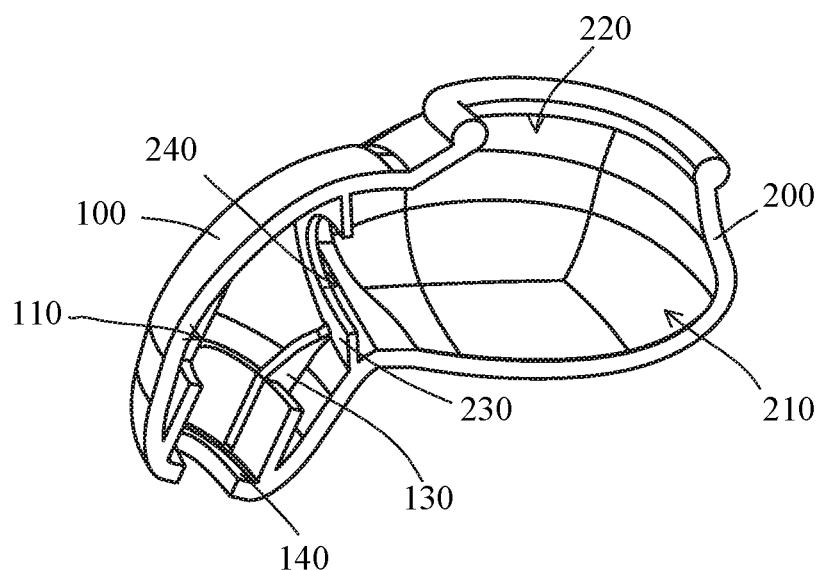
FIG. 4 illustrates another cross-sectional view of the earplug structure according to an embodiment of the present disclosure.

The embodiments described herein, with reference to the accompanying drawings, are explanatory, illustrative, and used to generally understand the present disclosure. Furthermore, directional terms described by the present disclosure, such as upper, lower, top, bottom, front, rear, left, right, inner, outer, side, circumference, center, horizontal, vertical, axial, radial, top layer, bottom layer, etc., are only directions by referring to the accompanying drawings, and thus the used directional terms are used to describe and understand the present disclosure, but the present disclosure is not limited thereto.

Referring to FIGS. 1-4, an earplug structure 10 of an embodiment of the present disclosures includes a sound guide part 100, a body 200, a sound guide component 300, and a gap G. The sound guide part 100 is configured to be inserted into an ear canal of an ear of a wearer. The sound guide part 100 includes a sound guide chamber 110 and a sound output opening 120. The sound guide chamber 110 is disposed inside the sound guide part 100, and the sound output opening 120 is disposed on the sound guide part 100 for outputting sound to the ear canal. The body part 200 extends outwardly from the sound guide part 100 and is configured to face an auricle region of the ear. The body part 200 includes a receiving space 210 and an opening 220, wherein the receiving space 210 is disposed inside the body part 200 and in communication with the sound guide chamber 110, and the opening 220 is disposed on the body part 200 and in communication with the receiving space 210. The sound guide component 300 is positioned inside the sound guide chamber 110 and is made of hard material. The gap G is formed by the sound guide part 100 and sound guide component 300.

In the embodiment of the present disclosure, the sound guide part 100 is configured to be inserted into an ear canal of an ear of a wearer, and the sound guide part 100 forms a seal with the ear canal of the wearer. The sound guide component 300 is positioned in the sound guide chamber 110, so that sound is directly transmitted to the ear canal without being easily lost. Therefore, the earplug structure 10 of the embodiment has good sound transmission.

In addition, since the body part 200 is configured to face the auricle region of the ear, the earplug structure 10 of the embodiment is comfortable to wear. The earplug structure 10 is configured to be inserted into the ear canal of the ear of the wearer and the body part 200 is configured to face the auricle region of the ear, such that earplug structure 10 has at least one of the advantages selected from comfortable to wear, easy to snap in the ear, holds firmly in place, ergonomic, and good sound transmission.

In an embodiment, the earplug structure 10 includes a plurality of support bars 130 provided on an inner surface of the sound guide part 100. In detail, the support bars 130 are a plurality of soft support bars to form the gap G. The gap G formed by the flexible support bars makes the sound guide part 100 resilient so that the earplug structure 10 is suitable for different sizes and depths of external ears of different wearers. Therefore, the earplug structure 10 is comfortable to wear, holds firmly in place, and is ergonomic. In addition, the support bars 130 makes the sound guide part 100 not be easily broken and deformed, and the strength of the entirety of the sound guide part 100 can be increased.

In an embodiment, a facing direction of the opening 220 of the body part 200 is different from a facing direction of the sound output opening 120. A width of the sound guide part 100 is less than a width of the body part 200. The body part 200 is placed in an external ear of the ear when the sound guide part 100 is inserted into the ear canal. In detail, the sound guide part 100 is, for example, a flexible and resilient sound guide tube made of rubber or silicone material. The sound guide part 100 may be a curved tubular structure. The sound guide part 100 is, for example, a soft colloid, so that when the sound guide part 100 is inserted into the ear canal, the sound guide part 100 is comfortable to wear and has an anti-slip function.

In the embodiment, the body part 200 is, for example, a flexible and resilient bowl-like component made of rubber or polysiloxanes material. The body part 200 is, for example, a soft colloid, and thus is comfortable to wear and has an anti-slip function when in contact with the external portion of the ear. In detail, the earplug structure 10 includes a blocking plate 230 disposed on an inner surface of the body part 200. The blocking plate 230 surrounds the inner surface of the body part 200 and forms a hole 240. The blocking plate 230 is near the sound guide part 100.

Figure 5:
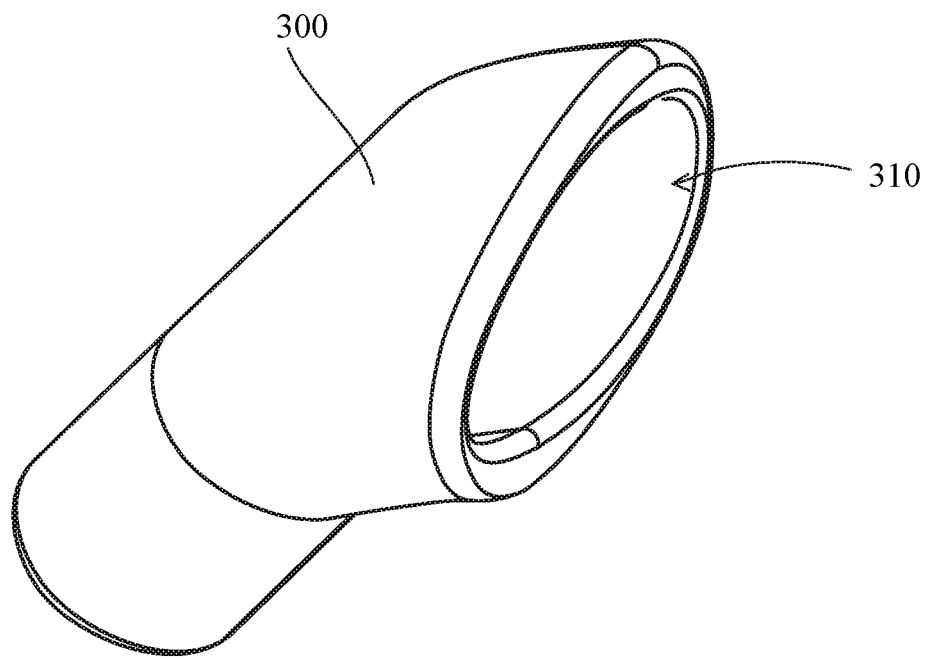
FIG. 5 illustrates a schematic perspective view of a sound guide component according to an embodiment of the present disclosure.
Figure 6:
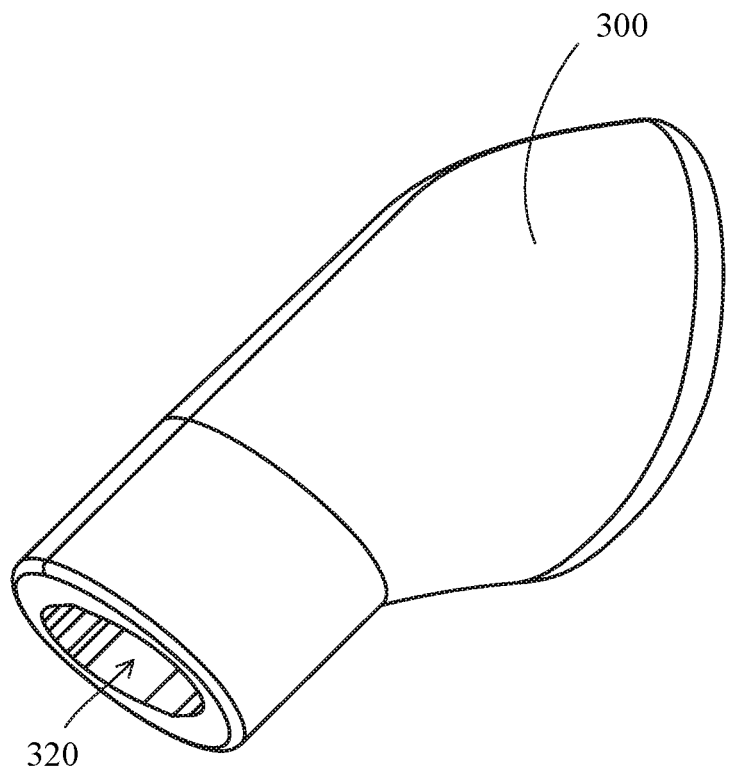
FIG. 6 illustrates another schematic perspective view of a sound guide component according to an embodiment of the present disclosure.

In the embodiment, the sound guide component 300 may be directly positioned on a surface of a bottom plate 140 of the sound guide part 100. The support bar 130 of the sound guide part 100 is configured to support and secure the sound guide component 300. The sound guide component 300 may be a curved tubular structure. The sound guide component 300 may be a hard material. Referring to FIGS. 5 and 6, the sound guide component 300 includes a front opening 310 and a sound guide channel 320, the front opening 310 faces the body part 200, and the sound guide channel 320 is disposed inside the sound guide component 300 and in communication with the front opening 310. The sound guide component 300 can be moved or rotated with respect to the bottom plate 140 and the support bar 130 of the sound guide part 100, such that angle of the sound guide channel 320 can be adjusted. In addition, by arrangement of the bottom plate 140, the sound guide component 300 may be restricted in the sound guide chamber 110, and the sound guide component may be prevented from falling out the sound guide chamber 110.

Figure 7:
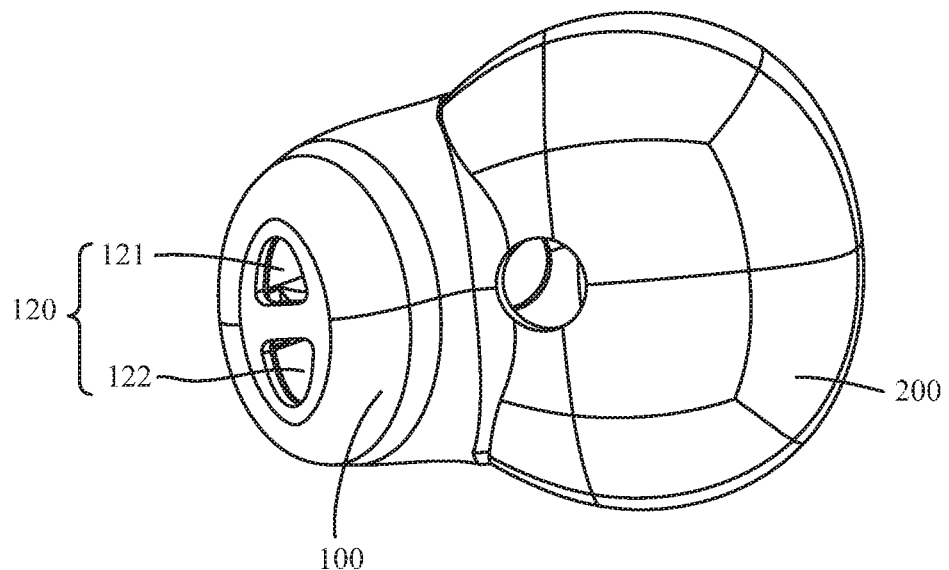
FIG. 7 illustrates a schematic perspective view of the earplug structure according to an embodiment of the present disclosure.
Figure 8:
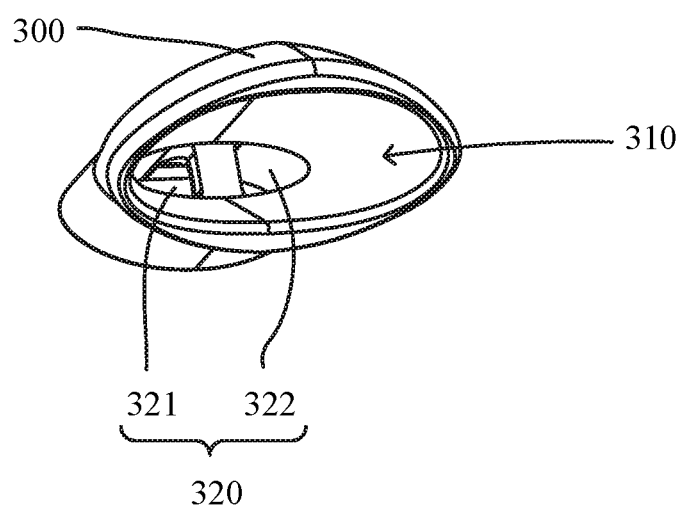
FIG. 8 illustrates a schematic perspective view of the sound guide component according to an embodiment of the present disclosure.

Referring to FIG. 7, in an embodiment of the present disclosure, the sound output opening 120 includes a first sound output opening 121 and a second sound output opening 122 separated from the first sound output opening 121. Referring to FIG. 8, in an embodiment of the present disclosure, the sound guide channel 320 includes a first sound guide channel 321 and a second sound guide channel 322 separated from the first sound guide channel 321. The first sound output opening 121 is corresponding to and in communication with the first sound guide channel 321. The second sound output opening 122 is corresponding to and in communication with the second sound guide channel 322. By arrangement of the first sound output opening 121, the second sound output opening 122, the first sound guide channel 321, and the second sound guide channel 322, low frequency sound transmission can be reduced and mid-high frequency sound transmission can be improved.

Figure 9:
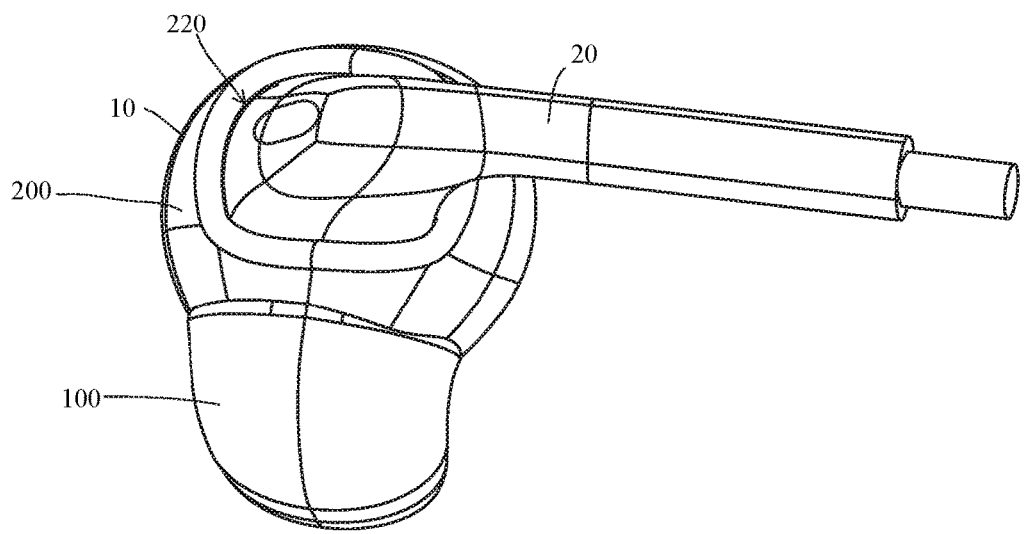
FIG. 9 illustrates an assembled schematic perspective view of an earphone device according to an embodiment of the present disclosure.

Referring to FIG. 9, an embodiment of the present disclosure provides an earphone device 30. The earphone device 30 includes the earplug structure 10 and an earphone 20. A body of the earphone 20 is disposed in the receiving space 210 of the body part 200 of the earplug structure 10 by the opening 220. In addition, the body of the earphone 20 is configured to cause the blocking plate 230 to form a recess to secure the sound guide component 300 so as to prevent sound leakage from interface of the earphone 20 and the sound guide component 300 and to prevent the sound guide component 300 from scratching the earphone 20. In an embodiment, the earphone 20 is, for example, headphone models AirPods and EarPods made by Apple Computer Inc.

In the embodiment of the present disclosure, the sound guide part 100 is configured to be inserted into an ear canal of an ear of a wearer, and the sound guide part 100 forms a seal with the ear canal of the wearer. The sound guide component 300 is positioned in the sound guide chamber 110, so that sound is directly transmitted to the ear canal without being easily lost. Therefore, the earplug structure 10 of the embodiment has good sound transmission.

The present disclosure has been described with embodiments thereof. The embodiments are not intended to limit the present disclosure, and it is understood that many changes and modifications to the described embodiments can be carried out without departing from the scope and the spirit of the invention that is intended to be limited only by the appended claims.

What is claimed is:

1. An earplug structure, comprising:
a sound guide part configured to be inserted into an ear canal of an ear, the sound guide part comprising a sound guide chamber and a sound output opening, wherein the sound guide chamber is disposed inside the sound guide part, and the sound output opening is disposed on the sound guide part for outputting sound to the ear canal;
a body part extending outwardly from the sound guide part and configured to face an auricle region of the ear, the body part comprising a receiving space and an opening for receiving an earphone, wherein the receiving space is disposed inside the body part and in communication with the sound guide chamber, and the opening is disposed on the body part and in communication with the receiving space;
a sound guide component positioned inside the sound guide chamber and being made of a hard material;
a gap formed by the sound guide part and sound guide component; and
a blocking plate disposed on an inner surface of the body part, wherein the sound guide component and the earphone are separated by the blocking plate.

2. The earplug structure as claimed in claim 1, wherein the sound guide component is a curved tubular structure.

3. The earplug structure as claimed in claim 1, wherein the sound guide component comprises a front opening and a sound guide channel, the front opening faces the body part, and the sound guide channel is disposed inside the sound guide component and in communication with the front opening.

4. The earplug structure as claimed in claim 3, wherein the sound output opening comprises a first sound output opening and a second sound output opening separated from the first sound output opening.

5. The earplug structure as claimed in claim 1, wherein the sound guide channel comprises a first sound guide channel and a second sound guide channel separated from the first sound guide channel, a first sound output opening is corresponding to and in communication with the first sound guide channel, and a second sound output opening is corresponding to and in communication with the second sound guide channel.

6. The earplug structure as claimed in claim 1, further comprising a plurality of support bars disposed on an inner surface of the sound guide part.

7. The earplug structure as claimed in claim 6, wherein the support bars are a plurality of soft support bars to form the gap.

8. The earplug structure as claimed in claim 1, wherein the blocking plate surrounds the inner surface of the body part and forms a hole.

9. The earplug structure as claimed in claim 1, wherein the blocking plate is near the sound guide part.

10. The earplug structure as claimed in claim 1, wherein the sound guide part is a curved tubular structure.

11. The earplug structure as claimed in claim 1, wherein a facing direction of the opening of the body part is different from a facing direction of the sound output opening.

12. The earplug structure as claimed in claim 1, wherein a width of the sound guide part is less than a width of the body part.

13. The earplug structure as claimed in claim 1, wherein the body part is placed in an external portion of the ear when the sound guide part is inserted into the ear canal.

14. An earphone device, comprising:
an earphone, comprising a body; and
an earplug structure, comprising:
- a sound guide part configured to be inserted into an ear canal of an ear, the sound guide part comprising a sound guide chamber and a sound output opening, wherein the sound guide chamber is disposed inside the sound guide part, and the sound output opening is disposed on the sound guide part for outputting sound to the ear canal;
- a body part extending outwardly from the sound guide part and configured to face an auricle region of the ear, the body part comprising a receiving space and an opening, wherein the receiving space is disposed inside the body part and in communication with the sound guide chamber, the opening is disposed on the body part and in communication with the receiving space, and the body of the earphone is disposed in the receiving space by the opening;
- a sound guide component positioned inside the sound guide chamber and being made of hard material;
- a gap formed by the sound guide part and sound guide component; and
- a blocking plate disposed on an inner surface of the body part, wherein the sound guide component and the earphone are separated by the blocking plat.

15. The earphone device as claimed in claim 14, wherein the body of the earphone is configured to cause the blocking plate to form a recess to secure the sound guide component.

16. The earphone device as claimed in claim 14, wherein the sound guide component is a curved tubular structure.

17. The earphone device as claimed in claim 14, wherein the sound guide component comprises a front opening and a sound guide channel, the front opening faces the body part, and the sound guide channel is disposed inside the sound guide component and in communication with the front opening.

18. The earphone device as claimed in claim 14, further comprising a plurality of support bars disposed on an inner surface of the sound guide part.

19. The earphone device as claimed in claim 18, wherein the support bars are a plurality of soft support bars to form the gap.

* * * * *